Feb. 17, 1953　　　R. W. DAYTON　　　2,628,632
SAFETY VALVE

Filed April 9, 1946　　　3 Sheets-Sheet 1

Inventor
Russell W. Dayton
by Roberts, Cushman & Grant
attys.

Feb. 17, 1953  R. W. DAYTON  2,628,632
SAFETY VALVE
Filed April 9, 1946  3 Sheets-Sheet 2

Inventor
Russell W. Dayton
by Roberts Cushman & Trevor
Att'ys.

Feb. 17, 1953 R. W. DAYTON 2,628,632
SAFETY VALVE
Filed April 9, 1946 3 Sheets-Sheet 3
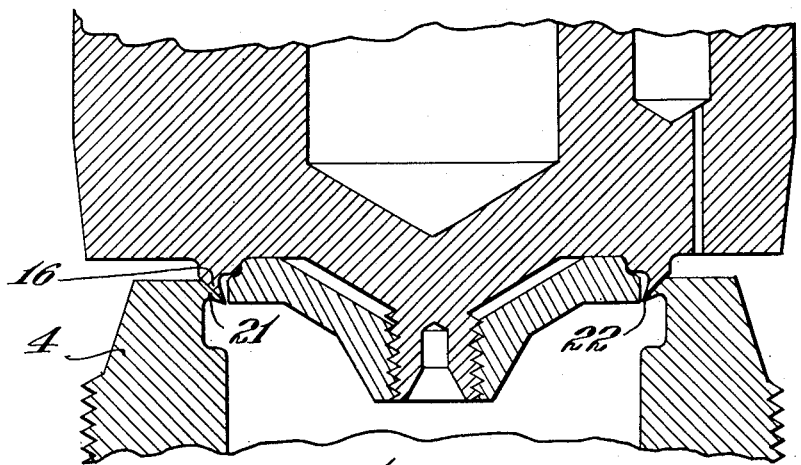
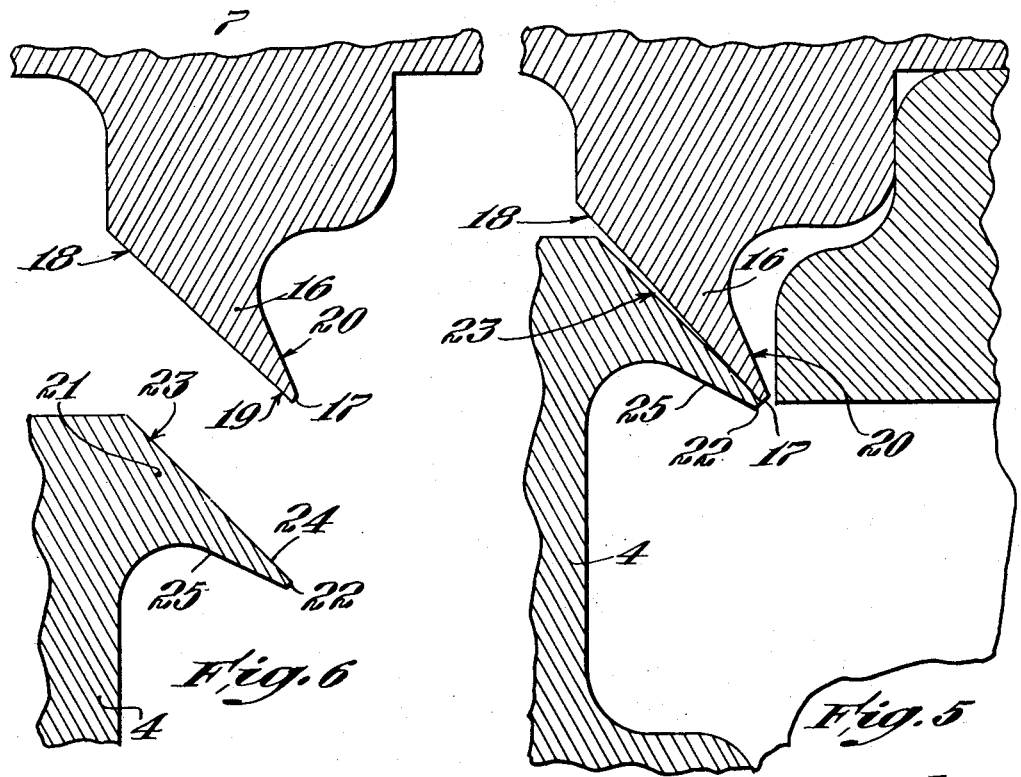
Inventor
Russell W. Dayton
by Roberts Cushman Grant
attys.

Patented Feb. 17, 1953

2,628,632

UNITED STATES PATENT OFFICE 2,628,632

SAFETY VALVE

Russell W. Dayton, Columbus, Ohio, assignor, by mesne assignments, to Manning, Maxwell & Moore, Inc., Bridgeport, Conn., a corporation of New Jersey Application April 9, 1946, Serial No. 660,650

6 Claims. (Cl. 137—469)

This invention pertains to spring-loaded pop safety valves, and to a method of minimizing leakage in such valves. While of broader utility it is especially valuable as embodied in a safety valve for use with saturated steam or other imperfect gas, whether hot or cold, and has for its principal object a novel method of minimizing leakage and the provision of a valve which does not leak even at high pressures or when the pressure nears the popping point.

The problem of leakage in steam safety valves has long been recognized by designers as one of the most difficult which they have to solve. One principal reason for this difficulty is found in the fact that in safety valves, as compared with shut-off valves or the like, the contacting surfaces of the head and seat are held together only by the difference in loading between the pressure imposed by the spring and the pressure of the fluid. For instance, assuming a pop safety valve having a seat area of one square inch and set to pop at a pressure of 1500 lbs. per square inch, the working fluid pressure would normally be approximately 1440 lbs. so that the available loading force for holding the head in contact with the seat is only 60 lbs. per square inch. Obviously such an effective loading pressure is wholly insufficient to mould the contacting faces of an ordinary head and seat so as to iron out any irregularities and thus to insure a leak-tight contact. As the pressures increase, the problem becomes more and more serious. Furthermore, if leakage is once established, the flow of steam at extremely high velocity through the leak quickly erodes the opposed surfaces of the seat and head so that they no longer even approximate contact, and the leak becomes permanent and progressively worse.

Many attempts have been made to solve the problem, but previously without success; for instance it has been proposed very carefully to finish the contacting surfaces of the seat and head so as to avoid any relative creep of the surfaces in response to temperature changes, and thus to avoid abrasion of the surfaces by contact with each other and the initiation of leakage. However, experiment shows that so long as the valve is actually tight, the temperature is substantially uniform all of the way around the seat, so that temperature differentials do not actually produce creepage and thus can not be the cause of initial leakage. On the other hand, extended experiments (in which a large number of thermo-couples were distributed about the periphery of the valve seat to facilitate accurate temperature measurements) have shown that even the slightest leak, once initiated, rapidly develops into a very serious leak, not in the first instance by reason of the scoring or erosion of the opposed surfaces, but because the outwardly flowing and rapidly expanding fluid produces a temperature drop in the region of the leak with the result that the metal parts contract locally, thus immediately increasing the dimensions of the leak orifice so that the leak almost instantly becomes larger.

While careful finishing of the contacting surfaces may help in avoiding the initiation of leaks, it is very difficult as a practical matter to maintain such perfection of the contacting surfaces as to avoid leaks of what may be termed "microscopic" size, and as above noted, the usual loading is not sufficient to mould the contacting surfaces into such intimate contact as to eliminate minor imperfections. Thus under almost all practical conditions of service the contacting surfaces of the head and seat contain minor imperfections which, at least under high pressures and particularly when the pressure approaches the popping point, permit the escape of steam in minute quantities but sufficient by reason of the cooling effect above referred to, to cause the parts to contract, thus increasing the leak orifice and progressively resulting in more and more leakage.

While somewhat the same effect is observable when the pressure fluid is a perfect or substantially perfect gas, for example, nitrogen or superheated steam, such perfect or nearly perfect gases have far less cooling effect when expanding than saturated steam, and thus leakage from the above cause, when dealing with perfect or nearly perfect gases, is not so important. Thus, as above noted, the present invention is particularly valuable when dealing with such an imperfect gas as saturated steam, although it is obvious that somewhat improved effects result from the employment of the invention when a perfect gas constitutes the pressure medium. In this connection it is of interest to note that when the pressure of a perfect gas, for instance nitrogen, is gradually increased, the valve will show only moderate leakage until the popping point is reached, the leakage increasing very gradually with pressure increase. On the other hand, the same experiment performed with saturated steam shows that as the pressure increases the leakage first increases very gradually, but, at some pressure well below the popping point, the leakage very suddenly increases to an extremely high value which is maintained until the fluid pressure reaches the popping point. Specifically it was found that steam leakage at 10% below the popping point was approximately six hundred times greater than nitrogen leakage, while at the blow-down pressure steam leakage was approximately ten thousand times greater than nitrogen leakage. It is thus very evident that the very pronounced cooling effect resultant from the sudden expansion of the saturated steam is responsible for a great part at least of the observed leakage in a pop safety valve when the pressure rises toward the popping point. Obviously, similar effects result, whether the pressure fluid be initially hot, like saturated steam, or initially sensibly cold, like a gaseous refrigerant which is further cooled by expansion. Thus, when herein reference is made to "pressure fluid" it is to be understood as referring to a gaseous medium, whether a perfect or imperfect gas and whether initially hot or cold.

Having thus established that irregular cooling due to leakage is at the root of the leakage problem, various possibilities for solving this problem have been considered. First, and perhaps the most obvious, is that of so finishing the contacting surfaces that even microscopic leakage cannot take place. However, as above noted, this seems to be an impractical solution because of the inherent difficulties of maintaining perfection of the contacting surfaces during use. Secondly, the effects of localized cooling might perhaps be to some extent nullified by the employment of materials having a very low coefficient of expansion. Such a material, for example, might be a high temperature Invar having an expansion coefficient of about $4 \times 10^{-6}$ ins./in./deg. C. While materials of low thermal expansion appear to have possibilities from the theoretical standpoint, there are some practical disadvantages connected with their use. A third mode of solving the problem, and one which has been found wholly practical and adequate, consists in so designing the contacting surfaces of the seat and head as to insure rapid heat conduction, and the location of the surfaces in such relation to the pressure fluid that the neighborhood of leaks will be kept at all times substantially at the temperature of the fluid within the container, and so that, even at the low effective loading as the popping point is approached, the surfaces will make a firm and leak-tight contact. The mode of designing the contacting surfaces to obtain these effects will be pointed out in the following more detailed description and by reference to the accompanying drawings wherein Fig. 1 is a vertical diametrical section, in the plane of the axis of the delivery chamber, illustrating a pop safety valve of generally conventional type, but embodying the present invention;

Fig. 4 is a fragmentary vertical diametrical section, through the head and seat bushing of a pop valve, embodying a modification of the structure illustrated in Fig. 1;

Fig. 5 is a fragmentary view at the same section as Fig. 4, but showing the contacting elements of the head and seat bushing to greatly enlarged scale;

Fig. 6 is a view similar to Fig. 5, but showing the head and seat widely separated;

Figure 1:
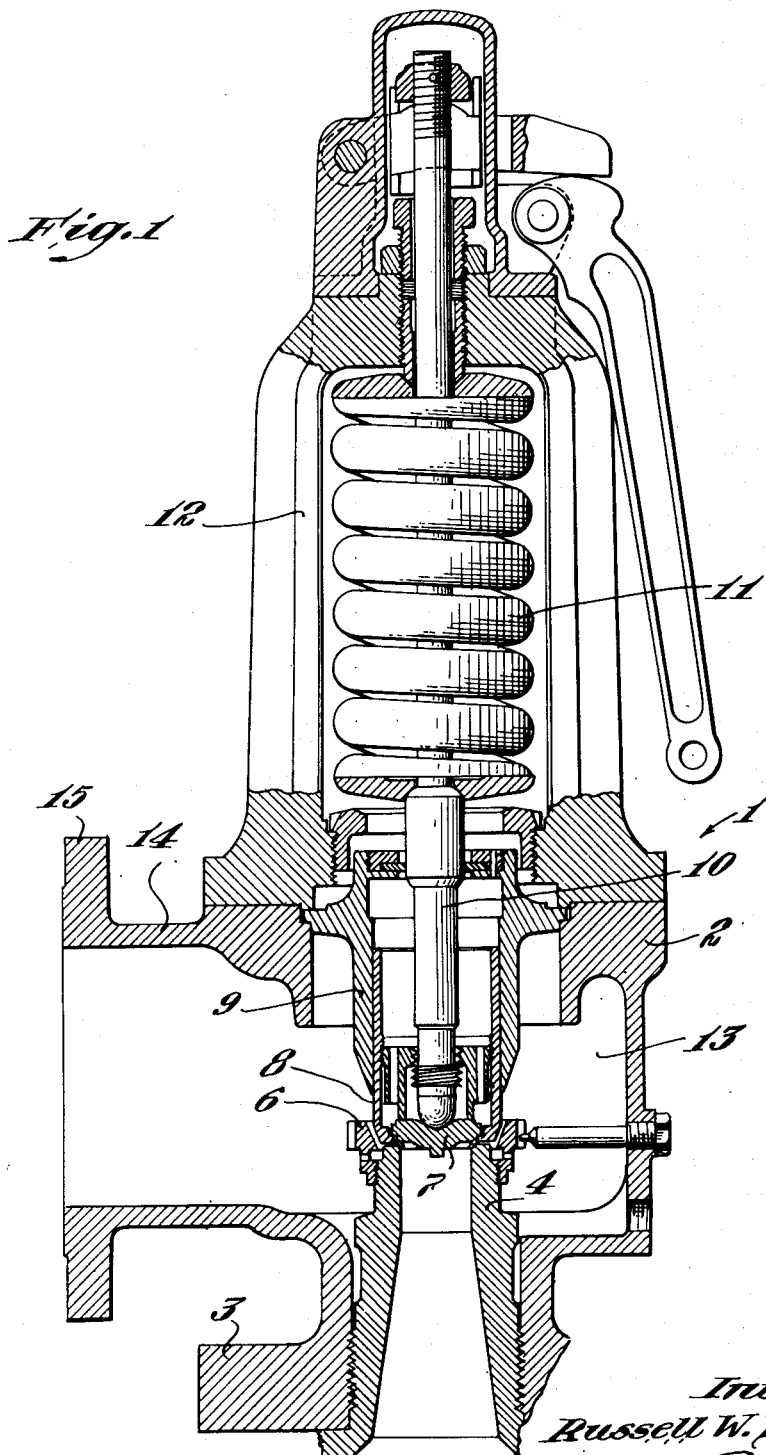

Referring to the drawings, the numeral 1 designates generally a pop safety valve, such as is commonly employed on steam boilers or the like, for relieving excess pressure. This valve comprises a casing 2 having the attaching flange 3 at its lower end, and having arranged within it the seat support 4 which may, for example, be a bushing in general similar to that disclosed in the patent to Graesser et al., No. 1,668,453, dated May 1, 1928, although the particular form of seat support is immaterial so far as the present invention is concerned.

Figure 2:
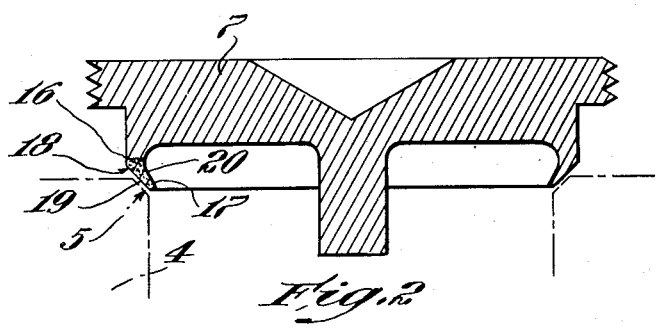
Fig. 2 is a diametrical vertical section, to larger scale, showing a portion of the valve head and details of the improved construction constituting the present invention.

As shown in Fig. 2, the seat support has the beveled seat surface 5 at its upper end, said surface, as illustrated, being inclined inwardly and downwardly at an angle of approximately 45° to the horizontal, and is externally screw threaded (Fig. 1) for the reception of the blow-down ring 6.

The valve head comprises the disk member 7 and the skirt portion 8, the latter being arranged to slide vertically in a guide sleeve 9 fixed in the casing. The valve head is urged downwardly toward the seat in opposition to the upward force of the pressure fluid by the spindle 10, which is loaded by means of the coiled compression spring 11 housed within the bonnet portion 12 of the valve.

The casing defines the valve chamber 13 and the outlet chamber 14, the casing being provided with a radial flange 15 to facilitate attachment of a delivery pipe to the casing.

Referring to Fig. 2, the disk or body portion 7 of the valve head is (as is customary in valves of this type) so thick and rigid as to withstand the forces exerted by the pressure fluid and spring without substantial distortion and is provided with an element 16 on which is formed the surface which contacts with the beveled seat surface 5. As illustrated in Figs. 1 and 2, this element 16 is an annular flange whose root or base is integral with the margin of the body portion or disk 7 and inclining downwardly and inwardly, the flange tapering in radial thickness from its root or base where it joins the disk 7 to its free edge or tip 17 the free edge being of a diameter substantially less than that of the root or base portion of the flange and being spaced from the underside of the body portion of the head. Preferably this taper is quite acute, for example from 15° to 20°, so that the free edge portion of the flange is quite thin and capable of conducting heat very rapidly. The upper or inner surface 20 of the flange merges with the under surface of the disk or head to form an annular channel, here shown as concave in vertical section and which is filled with the pressure fluid when the valve is closed.

The outer or under surface 18 of this flange may be inclined at substantially the same angle as the beveled seat surface 5, the contact surface 19 (that is to say the marginal portion of surface 18 which engages the seat) being located adjacent to the free edge or tip 17 of the flange. However, in a preferred construction, the surfaces 18 and 5 converge inwardly at a slight angle, for example 2°, so that they tend to contact first at their inner edges. The inner surface 20 of the flange is freely exposed to the static pressure fluid beneath the disk 7 when the valve is closed, the surface 20, extends upwardly and outwardly for a distance at least as great as the width of the contact surface 19 so that the material of the flange on which the contact surface is formed is kept hot by the rapid conduction of heat from the surface 20 through the substance of the flange, the flange being so thin at that portion which carries the contact surface that heat conduction is extremely rapid so that variations in temperature of the contact surface, due for example to localized leakage, are reduced to a minimum.

Figure 3:
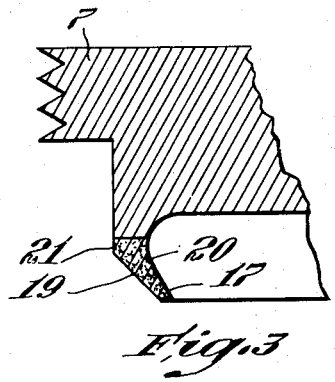
Fig. 3 is a view similar to Fig. 2, but illustrating a modification.

Further, it is contemplated, as illustrated in Fig. 3, that the flange 21 may be made of material different from that of the disk 7, for instance of the material known as Invar, or some other substance having an extremely low coefficient of thermal expansion.

When the valve head is seated, the finished contact surface 19 engages the beveled seat surface 5 and since the static fluid pressure acts against the inner surface 20 in a direction nearly normal to the surface 19, the pressure, acting upon its inner surface, urges it very firmly against the seat 5 and tends to mould the surface 19 to the seat surface 5 so as to compensate for any very slight irregularities. The valve head is thus kept very firmly closed by the action of the static pressure fluid itself, the latter assisting the loading spring in holding the valve closed. On the other hand, if a microscopic leak does develop, the rapid transfer of heat through the substance of the flange substantially compensates for the decrease in temperature due to the sudden expansion of the escaping steam, so that the leak does not tend to increase by contraction of the parts as it does under ordinary circumstances. If the flange be of material having a low thermal expansion, such slight drop in temperature at the location of the leak as may occur in spite of the provision for rapid heat transfer, is nullified by the reluctance of the metal to contract in response to such slight temperature drop.

In Figs. 4, 5 and 6, a modification is illustrated wherein the disk 7 with its flange 16 is substantially as above described, but wherein the seat support 4 (instead of having a beveled seat surface formed directly on the cylindrical body portion of the bushing) is provided with a seat-carrying element 21 in the form of an annular flange tapering in radial thickness from its union with the support 4 to its free edge 22 and having its outer sloping surface 23 finished near its free edge to form a contact or seat surface 24 for engagement with the contact surface 19 of the flange 16. As illustrated in Fig. 6, the flanges 16 and 21 both taper from their bases toward their free edges on an angle of approximately 20°, the free edges being of the order of 0.003 inch thick. Preferably the outer surfaces 18 and 23 of the flanges 16 and 21 are not exactly parallel but converge inwardly at a slight angle, for instance of 2°, so that they tend to contact first at their extreme inner ends. However, since the free marginal portions of these flanges are very thin, the application of the loading pressure, assisted by the pressure of the static fluid acting upon their inner surfaces 20 and 25, respectively, tends to bring the surfaces 18 and 23 into parallel relation, thus gradually increasing the surface of contact as the load increases.

In this instance both flanges are exposed to the heat of the static pressure fluid as well as to the pressure of the latter, so that both contact surfaces are kept at the temperature of the pressure fluid, and if a microscopic leak does develop the localized cooling effect is reduced to a negligible amount by reason of the rapid conduction of heat through the substance of the flanges to the contact surfaces.

Figure 7:
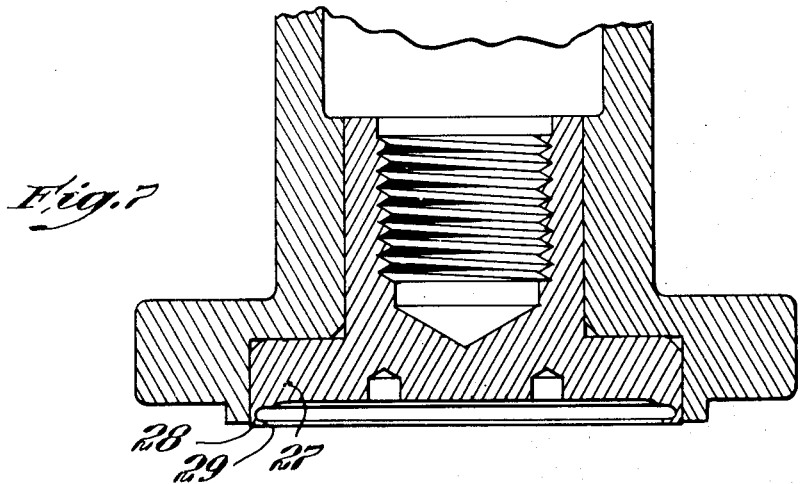
Fig. 7 is a fragmentary diametrical vertical section showing the invention in a further embodiment.
Figure 8:
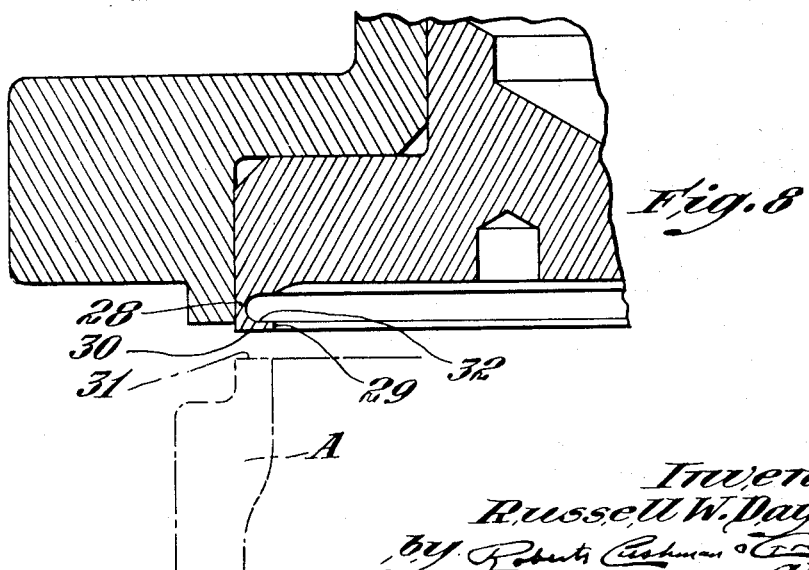
Fig. 8 is a fragmentary vertical section, on the same plane as Fig. 7, but to larger scale and indicating the position of the valve seat.

In Figs. 7 and 8 a further modification is illustrated wherein the valve head disk 27 is provided with the downwardly directed flange member 28 having the free inner edge 29 and the substantially horizontal contact surface 30 designed to contact a horizontal seat surface 31 at the upper end of the support 4. In this instance, as in the previously described arrangements, the inner surface 32 of the flange is exposed to the pressure fluid, and since the flange is quite thin at that portion which carries the seat surface, heat is rapidly transmitted through the flange from the pressure fluid, so that the seat-contacting surface of the flange is kept hot, thus substantially preventing local contraction if a microscopic leak develops.

It may be noted that in each instance, although the element on which the contact surface is formed is very thin to facilitate rapid heat transfer, yet this thin portion merges with a heavy base capable of absorbing the shock of closing. It is further to be observed that by using a seat surface having a slope of 45° or less to the horizontal (as is customary in safety valves) there is no danger that the valve head will so wedge itself against the seat as to delay lift of the head when the pressure rises to the predetermined popping point.

While certain desirable embodiments of the invention have been illustrated by way of example, it is to be understood that the invention is broadly inclusive of any and all modifications falling within the scope of the appended claims.

I claim:

1. A pop safety valve for use with high pressure saturated vapor, said valve comprising a rigid annular seat, an upwardly movable valve head normally exposed at its underside to pressure fluid tending to lift it from the seat, and a loading spring arranged to exert downward force against the head thereby normally to keep the head seated, the head being free to lift from the seat except for the force exerted by the spring, the head comprising a rigid body capable of withstanding, without substantial distortion, the loads imposed by the pressure fluid and spring, the head comprising an annular flange which is joined at its root portion to the body of the head and which extends downwardly and inwardly with its free inner edge portion spaced below the body, the flange having a finished under surface for contact with the seat, the upper surface of the flange merging with the undersurface of the body of the head to form an annular channel which is filled with the pressure fluid when the valve is closed, the free edge portion of the flange being of lesser diameter than its root portion and so thin as rapidly to transmit heat from the pressure fluid within said channel to the seat-contacting surface of the flange.

2. A pop safety valve according to claim 1 further characterized in that the seat has a beveled surface which slopes inwardly and downwardly at an angle not exceeding 45° to the horizontal and with which the under surface of the flange contacts when the valve is closed, the lower surface of the flange being inclined inwardly and downwardly at an angle approximating that of the beveled seat, the upper and under surfaces of the flange converging toward the free inner edge of the flange at an angle of from 15° to 20°.

3. A pop safety valve according to claim 1 further characterized in that the flange tapers from its root to its free edge with a taper of from 15° to 20°, the free edge portion of the flange being of the order of 0.003 inch in thickness in a radial plane.

4. A pop safety valve according to claim 1 further characterized in that the annular channel at the junction of the flange and body of the head is concave in vertical section, the seat being beveled inwardly and downwardly to have an inclined flange-contacting surface whose slope does not substantially exceed 45° to the horizontal, that portion of the under surface of the flange which contacts the seat surface being of lesser radial width than the inner surface of the flange which is exposed to the pressure fluid.

5. A pop safety valve according to claim 1 further characterized in that the flange is of a metal having a low coefficient of thermal expansion and a high thermal conductivity.

6. A pope safety valve according to claim 1 further characterized in that the seat is flat and horizontal, and in that the finished seat-contacting under surface of the flange is likewise flat and horizontal.

RUSSELL W. DAYTON.

REFERENCES CITED

The following references are of record in the file of this patent:

UNITED STATES PATENTS

| Number | Name | Date |
|---|---|---|
| 116,084 | Neynaber | June 20, 1871 |
| 820,154 | Towne | May 8, 1906 |
| 1,508,102 | Holt | Sept. 9, 1924 |
| 1,514,233 | Searles | Nov. 4, 1924 |
| 1,697,516 | Hele-shaw et al. | Jan. 1, 1929 |
| 2,124,374 | Mulley | July 19, 1938 |

FOREIGN PATENTS

| Number | Country | Date |
|---|---|---|
| 11,694 | Great Britain | of 1895 |